A. TONINI.
BOTTLE STRAINER.
APPLICATION FILED JUNE 11, 1908.
920,791.
Patented May 4, 1909.
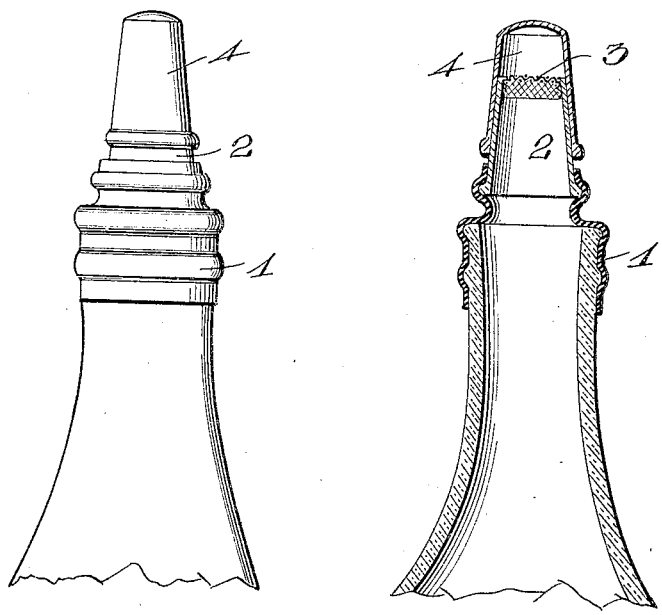
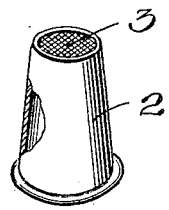
Witnesses
C. H. Griesbauer
Inventor
August Tonini
By H. B. Willson & Co
Attorneys

UNITED STATES PATENT OFFICE.

AUGUST TONINI, OF GRAND VIEW, INDIANA.

BOTTLE-STRAINER.

No. 920,791.     Specification of Letters Patent.     Patented May 4, 1909.

Application filed June 11, 1908. Serial No. 437,999.

*To all whom it may concern:*

Be it known that I, AUGUST TONINI, a citizen of the United States, residing at Grand View, in the county of Spencer and State of Indiana, have invented certain new and useful Improvements in Bottle-Strainers; and I do declare the following to be a full, clear, and exact description of the invention, such as will enable others skilled in the art to which it appertains to make and use the same.

My invention relates to improvements in what may be termed bottle strainers, and which is adapted for protection of the contents of a bottle.

It has for its object to carry out these ends in a simple, inexpensive and effective manner, and to provide for readily constructing and operating the device.

With these and other objects in view, the invention consists of certain novel features of construction, combination and arrangement of parts as will be described and particularly pointed out in the appended claim.

In the accompanying drawing, illustrating the preferred embodiment of my invention, Figure 1 is a side elevation thereof, including the protective cap for the contents of the bottle or receptacle; Fig. 2 is a vertical longitudinal sectional view; and Fig. 3 is a detail perspective view of the tubular support and the straining member.

In carrying out my invention, I provide a suitable elastic or resilient tubular bottle engaging member 1, the lower end of which is adapted to receive the mouth of the bottle neck and the upper end of which is of reduced size. A gradually tapering tubular support 2 is arranged with its lower end seating in the upper end of the bottle engaging member 1 and a straining member 3 of cup-shaped form and constructed from woven wire or the like closely and removably fits in the upper end of the tubular support and is entirely protected thereby.

From the foregoing, it is evident that the several parts comprising the strainer may be readily assembled or disassembled as the occasion may require and that the bottle engaging member together with the tubular support and straining member may be placed upon the market as a separate article from the bottle.

A closure or cap, 4, is adapted to be suitably placed upon the tubular support for excluding any foreign substance which would otherwise enter the bottle through the strainer, and thus protect the contents of the bottle or receptacle when in place upon a shelf or when being transported. It is also to be noted that this device is adapted to be readily carried by a person when traveling and may be readily slipped upon or applied to the neck of a bottle for use thereon, as in protecting the contents of such bottle, as above indicated, from the entrance of any foreign substance.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim as new and desire to secure by Letters-Patent, is:

As an article of manufacture, a bottle strainer comprising a tubular resilient bottle engaging member having a body portion to receive the mouth of the bottle neck and an outer contracted portion, a gradually tapering tubular support of stiff material and of uniform thickness having an annular exterior flange at its lower end adapted to seat in the outer contracted end of the bottle engaging member, a cup-shaped straining member removably fitting entirely within the restricted end of the tubular support and protected thereby, and an imperforate cap closely fitting over the restricted end of the tubular support, each of the parts comprising the strainer being freely removable from the part with which it is engaged, whereby the several parts may be readily assembled to form the strainer or disassembled.

In testimony whereof I have hereunto set my hand in presence of two subscribing witnesses.

AUGUST TONINI.

Witnesses:
   B. F. STEWART,
   S. W. STUTEVILLE.